(No Model.) 3 Sheets—Sheet 1.

N. THOMPSON.
UNION OR COUPLING FOR PIPES, HOSE, AND OTHER ARTICLES.

No. 331,170. Patented Nov. 24, 1885.

Attest
D. M. Hopkins
F. A. Hopkins

Inventor
Nathan Thompson
By Knight Bros.
Attys (No Model.) 3 Sheets—Sheet 2.
N. THOMPSON.
UNION OR COUPLING FOR PIPES, HOSE, AND OTHER ARTICLES.
No. 331,170. Patented Nov. 24, 1885.
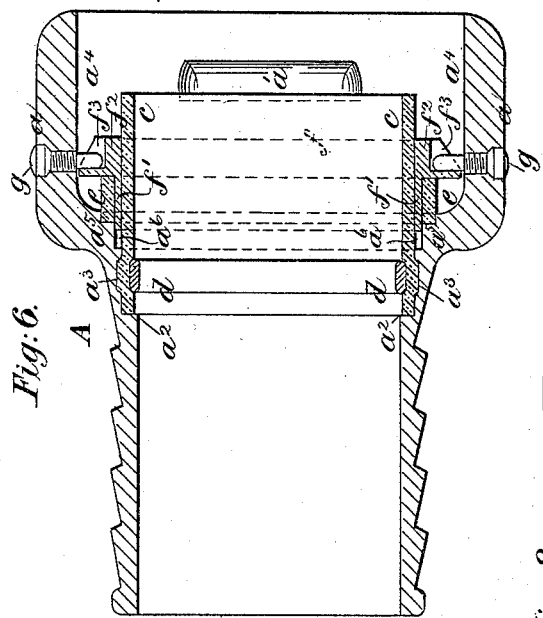
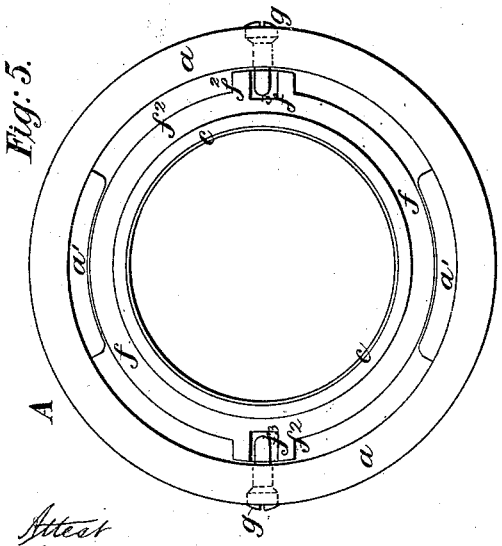
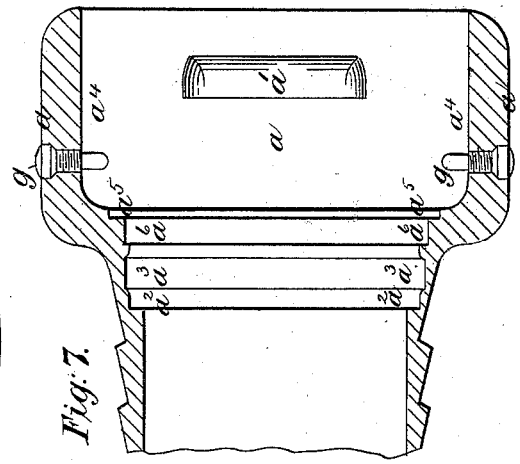
Attest
J. W. Hopkins
F. A. Hopkins
Inventor
Nathan Thompson
By Knight Bros
Attys (No Model.) 3 Sheets—Sheet 3.
N. THOMPSON.
UNION OR COUPLING FOR PIPES, HOSE, AND OTHER ARTICLES.
No. 331,170. Patented Nov. 24, 1885.
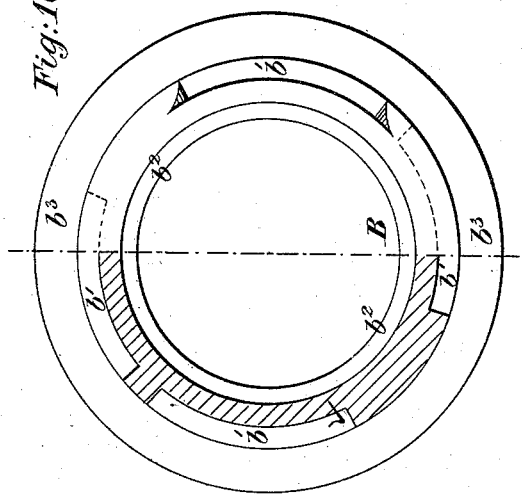
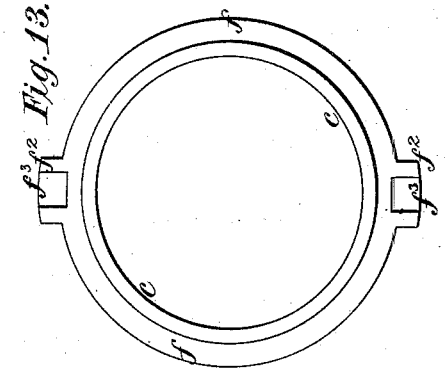
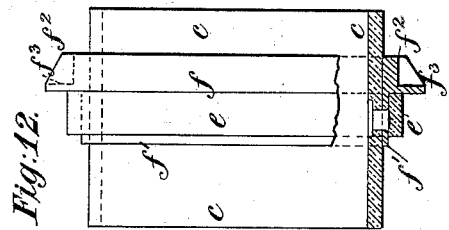
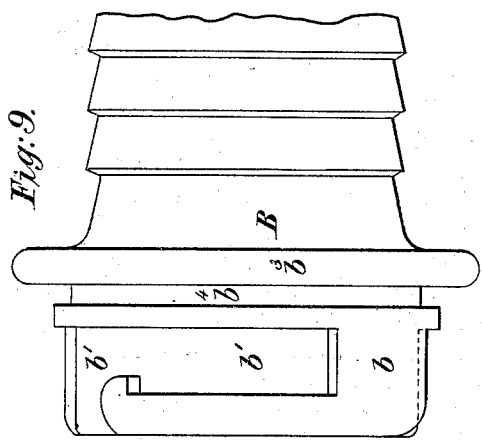
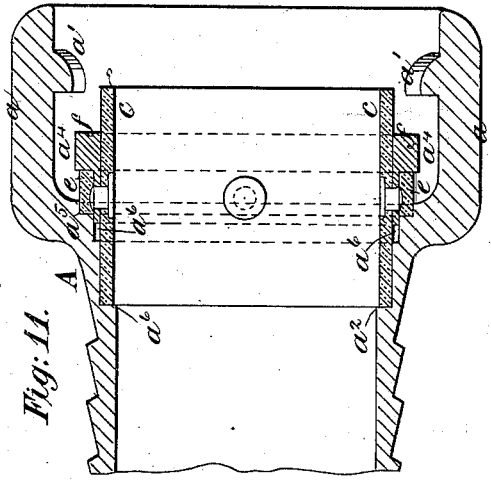

UNITED STATES PATENT OFFICE.

NATHAN THOMPSON, OF 23 SOUTHAMPTON BUILDINGS, COUNTY OF MIDDLESEX, ENGLAND.

UNION OR COUPLING FOR PIPES, HOSE, AND OTHER ARTICLES.

SPECIFICATION forming part of Letters Patent No. 331,170, dated November 24, 1885.

Application filed August 10, 1885. Serial No. 173,915. (No model.)

*To all whom it may concern:*

Be it known that I, NATHAN THOMPSON, a citizen of the United States of America, residing at 23 Southampton Buildings, in the county of Middlesex, England, marine engineer, have invented certain new and useful Improvements in Unions or Couplings for Pipes, Hose, and other Articles, of which the following is a specification.

The invention has for its object improvements in unions or couplings for pipes, hose, and other articles whereby I obtain a joint capable of withstanding high pressures, combined with simplicity and cheapness of construction and facility of manipulation. The two parts of the coupling are connected together by simply forcing them together endwise, and then giving a partial turn of one part in relation to the other, when they will become securely locked together; and, in order that my said invention may be more clearly understood and readily carried into effect, I will proceed, aided by the accompanying drawings, more fully to describe the same.

Figure 2:
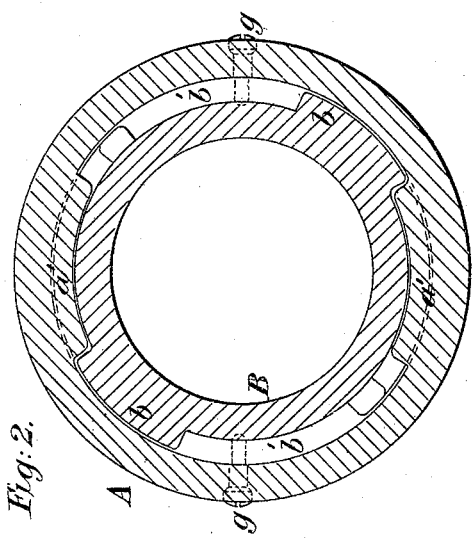
Figure 4:
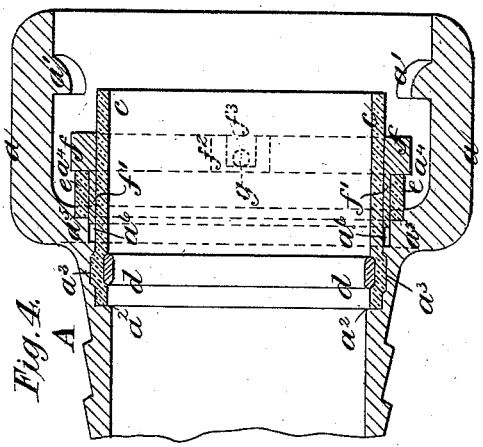
Figure 1:
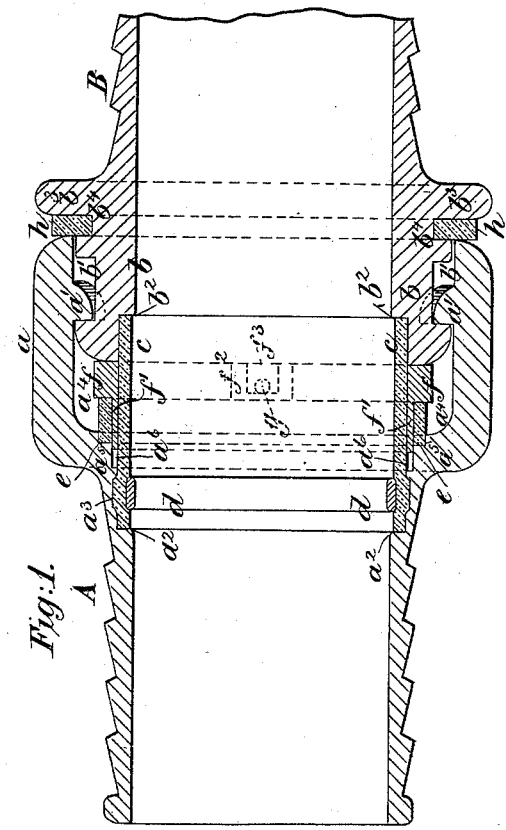
Figure 3:
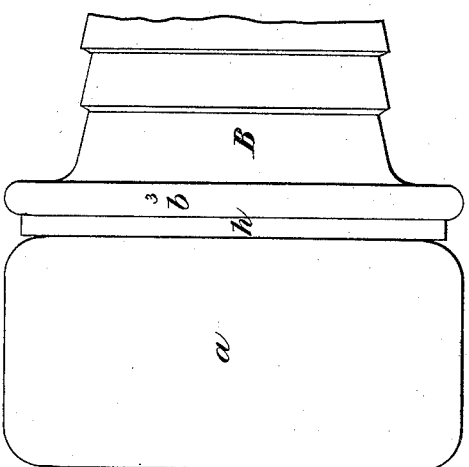

In the drawings, Figure 1 is a a longitudinal section, Fig. 2 is a transverse section, and Fig. 3 is an exterior view, of a coupling or union constructed according to my invention. Fig. 4 is a longitudinal section, Fig. 5 is an end view, and Fig. 6 is a section similar to Fig. 4, but taken at right angles thereto, of part A of the union or coupling with its internal fittings. Fig. 7 is a longitudinal section, and Fig. 8 is an end view, of part A without its interior fittings. Fig. 9 is an exterior view, and Fig. 10 is an end view, partly in section, of part B of the union or coupling. Fig. 11 is a longitudinal section of part A, showing a slight modification, and Fig. 12 is a side view, partly in section, and Fig. 13 is an end view of parts thereof.

In all the figures like parts are marked with similar letters of reference.

In carrying my present invention into effect I form the part A of the coupling or union with a cylindrical socket, $a$, and the part B with a cylindrical plug, $b$, preferably as close a fit as is consistent with the easy insertion and removal of said plug $b$ into and from the socket $a$. The inner face of the socket $a$ is formed with two, or it may be more, projections, $a'$, and the plug $b$ is formed with a corresponding number of recesses, $b'$, shaped so as to receive the said projections $a'$, and by turning the parts A and B upon each other to hold them securely locked in a somewhat similar manner to what is known as a "bayonet-joint." These recesses for the first part of their course run in a direction longitudinally of the plug $b$, then in a transverse or circumferential direction, and finally in a short return longitudinal direction. The last-mentioned portion of each groove $b'$ is formed longer in its circumferential direction than the projection $a'$, acting in combination therewith, whereby in the event of dirt or other matter entering the space between the flange $b^3$ and the end of the socket $a$ a slight rotation of the parts A and B on each other may be effected, by which means such dirt or other matter will be broken up and caused to fall out of such space, after which the parts A and B can be readily disconnected.

The two parts of the coupling are each formed with an enlarged cylindrical chamber or bore, $a^2$ or $b^2$, to receive a sleeve or tube, $c$, of india-rubber, which is of such thickness that its bore or internal diameter is equal to or it may be slightly larger than that of the parts A and B.

In the arrangement shown at Figs. 1 to 10 a spring-ring, $d$, is employed, to hold the india-rubber tube or sleeve $c$ in position by forcing a part of the same into an annular recess, $a^3$, in the enlarged chamber or bore $a^2$. The socket $a$ is formed deeper than the plug $b$, thereby leaving a cylindrical space, $a^4$, at the bottom, which is a continuation of the bore or internal diameter of the said socket $a$.

In the bottom of the socket $a$, between it and the india-rubber sleeve or tube, I place a spring consisting of a short india-rubber tube, $e$, (or other spring or springs,) and on the top thereof, in some cases, I place a metal ring, $f$, which is formed with a short descending cylindrical portion, $f'$, which passes between the said spring or springs $e$ and the india-rubber sleeve or tube $c$. The inner end of the india-rubber tube $e$ rests in a cylindrical recess, $a^5$, and the cylindrical portion $f'$ of the metal ring $f$ works within a cylindrical recess, $a^6$, while the exterior diameter of the metal ring $f$ is made to fit the bore or internal diameter of the socket $a$, by which means the said parts $e$ and $f$ are retained in their correct position. The metal ring $f$ is formed for the greater part of its circumference of such diameter as to enable it when being placed in position in the socket $a$ to pass the projections $a'$ therein, after which it is retained in position by means of studs or pins $g$ entering holes or recesses $f^3$, formed in projections $f^2$ in the circumference of said ring $f$, which will, however, permit of endwise motion thereto.

In the modification represented at Figs. 11, 12, and 13 the india-rubber tube or sleeve $c$ is shown riveted to the cylindrical extension $f'$ of the ring $f$, by which means said sleeve or tube $c$ is securely held in its proper position.

The two parts A B of the coupling are connected together by simply forcing them together endwise, and then giving a partial turn of one part in relation to the other, when they will become securely locked together. In pressing the two parts A B together the metal ring $f$, resting on the spring or springs $e$, is at first somewhat depressed; then, when on the turning of the parts the studs or projections $a'$ reach the return portions of the bayonet grooves $b'$, the said ring $f$ is forced forward by the said spring or springs $e$, which thereby force the plug $b$ outward, so as to bring the studs or projections $a'$ into the return portions of the bayonet-grooves $b'$, and there retain them against accidental displacement. If desired, the two parts A B of the coupling may be still further secured by a spring or other catch or stop, as will be well understood; but this addition I consider unnecessary. In cases where the metal ring $f$ is dispensed with the spring or springs $e$ will act directly upon the end of the plug $b$ in a similar manner. I provide the plug $b$ with a flange, $b^3$, of the full exterior diameter of the socket $a$, and, if desired, in order to prevent the entrance of grit and dirt, an india-rubber ring, $h$, may be placed between the end of the socket $a$ and the flange $b^3$, as shown at Figs. 1 and 3, in which case the said ring is held in position in an annular groove, $b^4$. I have found, however, that this india-rubber ring is unnecessary.

Unions or couplings constructed in the manner herein shown and described are perfectly secure against accidental disconnection of the parts and against leakage, as on water passing through the same the india-rubber sleeve or tube $c$ is held by the pressure of water firmly against the walls of the enlarged cylindrical chambers $a^2$ $b^2$, and the greater the pressure the more secure is the joint.

Having now particularly described and ascertained the nature of my said invention and the manner of performing the same, I declare that what I claim is—

1. In unions or couplings, the combination of part A with a socket, $a$, projections $a'$, enlarged chamber or bore $a^2$, cylindrical space $a^4$, and recesses $a^5$ and $a^6$, to act in combination with an india-rubber tube or sleeve, $c$, metal ring $f$, spring $e$, and part B, which has a plug, $b$, formed with returned bayonet-grooves $b'$, and with an enlarged chamber or bore, $b^2$, substantially as herein shown and described, and for the purpose stated.

2. The combination of socket $a$, projections $a'$, enlarged chamber or bore $a^2$, cylindrical space $a^4$, plug $b$, grooves $b'$, enlarged chamber or bore $b^2$, india-rubber tube or sleeve $c$, and spring or springs $e$, all constructed substantially as herein shown and described, and for the purpose stated.

3. The combination, with the socket $a$ and the plug $b$, having the enlarged chamber or bore $a^2$ $b^2$, of the india-rubber tube or sleeve $c$, fitting in said enlarged bore or chamber, as and for the purpose set forth.

4. The combination, with the socket $a$, having the enlarged bore or chamber $a^2$ and the cylindrical space $a^4$, and the plug $b$, having the enlarged bore or chamber $b^2$, of the india-rubber tube or sleeve $c$, occupying said enlarged bore or chamber, the metallic ring $f f'$, surrounding said tube, and the spring $e$, all constructed and arranged substantially as set forth.

5. The combination, with the socket $a$ and plug $b$, having the enlarged bore or chamber $a^2$ $b^2$, of the india-rubber tube $c$, fitting within said chamber, and the expanding ring $d$ within said tube, for the purpose set forth.

6. The combination, with the socket $a$, having the enlarged bore or chamber $a^2$, and annular recess $a^3$, of the india-rubber tube $c$ and the expanding ring $d$, arranged substantially as set forth.

7. The combination, with the socket $a$, having the space $a^4$ and recess $a^6$, and the plug $b$, of the metallic ring $f$, having the contracted cylindrical portion $f'$, and the spring $e$, surrounding said contracted portion, as set forth.

NATHAN THOMPSON.

Witnesses:
  B. J. B. MILLS,
  B. M. WHITE,
*Both of 23 Southampton Buildings, London.*